Figure 1:
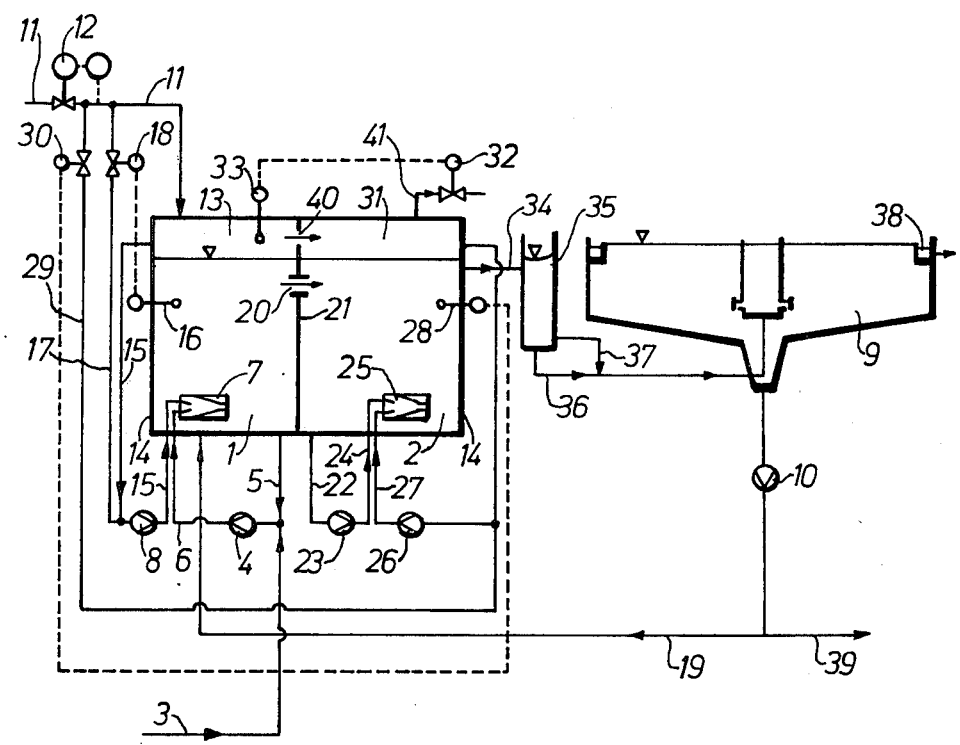

United States Patent [19]

Gorski et al.

[11] 4,071,443
[45] Jan. 31, 1978

[54] REGULATING OXYGEN INPUT IN TREATMENT OF EFFLUENT

[75] Inventors: Theodor Gorski; Adolf Heinen; Kurt Mack, all of Wuppertal, Germany

[73] Assignee: Bayer Aktiengesellschaft, Leverkusen, Germany

[21] Appl. No.: 709,977

[22] Filed: July 30, 1976

[30] Foreign Application Priority Data

Aug. 12, 1975 Germany .............................. 2535837

[51] Int. Cl.² .............................................. C02C 1/08
[52] U.S. Cl. .......................................... 210/7; 210/15
[58] Field of Search ........................................ 210/4–7, 210/14, 15, 63 R, 195 S, 198 R

[56] References Cited

U.S. PATENT DOCUMENTS

| 3,547,811 | 12/1970 | McWhirter | 210/7 |
|---|---|---|---|
| 3,660,277 | 5/1972 | McWhirter et al. | 210/7 X |
| 3,872,003 | 3/1975 | Walker | 210/15 X |
| 3,926,794 | 12/1975 | Vahldieck | 210/7 X |
| 3,939,066 | 2/1976 | Bauer | 210/15 X |
| 3,960,717 | 6/1976 | Wyatt | 210/7 X |
| 3,964,998 | 6/1976 | Barnard | 210/7 |
| 3,996,139 | 12/1976 | Prince et al. | 210/198 R |
| 3,997,437 | 12/1976 | Prince et al. | 210/195 SX |

*Primary Examiner*—John Adee
*Assistant Examiner*—Robert H. Spitzer
*Attorney, Agent, or Firm*—Burgess, Dinklage & Sprung

[57] ABSTRACT

In the introduction of a finely dispersed gas containing at least about 20 to 45% of oxygen by volume with intensive mixing into a vessel having a gas space and effluent containing biochemically oxidizable constituents, in the presence of activated sludge, the improvement which comprises a. introducing oxygen into the gas space of said vessel in such amount that the oxygen content is within 10% of a predetermined value;

b. a component volume of the gases in the gas space being ejected as a fine dispersion into the effluent, and c. directly introducing oxygen into the component volume being ejected into the effluent in such amount that the oxygen content in the effluent is within 60% of a predetermined value, whereby there is obtained an improved utilization of oxygen even in the event of fluctuations in load of the effluent. Advantageously the effluent from the first vessel cascades into a second vessel which is similarly treated. The predetermined values of the oxygen contents in the effluents in the first and second vessels are respectively from about 1 to 4 and 4 to 8 mg/l. The predetermined values of the oxygen contents in the first and second gas spaces are respectively from about 40 to 80% and 30 to 60% by volume.

1 Claim, 2 Drawing Figures

REGULATING OXYGEN INPUT IN TREATMENT OF EFFLUENT

There are already processes by which biologically degradable material, of the type present in industrial and communal effluents, is degraded with biologically active masses (activated sludge) by aeration with oxygen containing gases. In these processes, air, oxygen-enriched air or commercially pure oxygen is used as the aeration gas.

It is also known that, in the biological treatment of effluent, as with any bacterial activity, the degradation processes are critically dependent upon an adequate supply of oxygen. Accordingly, it is necessary artificially to supply the oxygen which the activated sludge requires for breathing. In general, the oxygen is taken from the surrounding atmosphere and introduced into the mixture of activated sludge and effluent to be purified in open basins. Since only about 2% of the atmospheric oxygen is utilized during passage through the activated sludge basin, large quantities of air have to be contacted with the mixture of activated sludge and effluent to be purified. This requires large basin volumes and/or a plurality of elaborate oxygen feed systems with a correspondingly high energy demand. Another disadvantage is the noxious odor given off as a result of droplet formation in the case of surface aerators.

German Auslegeschrifts Nos. 2,032,189; 2,032,440; 2,032,480; 2,032,528 and 2,032,535 describe processes which seek to obviate these disadvantages by using oxygen-enriched air or commercially pure oxygen. Closed aeration tanks are used, the gas being directly introduced into the mixture of activated sludge and effluent by means of a rotating gas-distributing system. To improve utilization of the oxygen, the aeration gas is recirculated. A cascade arrangement of the aeration systems has proved to be of advantage in this respect. The last stage in the cascade is followed by an intermediate or final settling stage. Intermediate settling is the separation of the partially purified effluent from the activated sludge, while final settling is the separation of the completely purified effluent from the activated sludge.

In view of fluctuations in load in the effluent, the oxygen demand varies to a very considerable extent especially in the cascade arrangement. These fluctuations in load occur in particular in the first cascades. In order to reduce the effect of the fluctuations in load in the first cascade, it is advantageous to make the first cascade larger than the following cascades. Preferably, the first cascade has two to three times the volume of the following cascades. From about 65 to 80% of the oxygen introduced into the installation are generally consumed in the first cascade. However, if the fluctuations in load in the effluent are relatively high ($\pm$ 100% of the normal value), it is not possible, even in the case of a cascade arrangement preceded by a double cascade, to keep the concentration of the oxygen dissolved in the activated sludge suspension within limits of from 2 to 4 mg/l. However, it is this very concentration range which has proved to be optimal to the efficiency of biological effluent treatment both for biological reasons and also for energy reasons.

In conventional processes, the oxygen was introduced into the gaseous phase of the first cascade in accordance with the oxygen demand of the effluent containing activated sludge. The gas deprived of oxygen which was formed in the gaseous zone was then introduced into a second and third cascade where it was further deprived of oxygen. At the end of the third cascade, the waste gas had an oxygen concentration of about 40 to 50% and a carbon dioxide concentration of from 50 to 60%. This method of regulation produced a gas with an oxygen concentration of about 70% to 80% in the gaseous phase of the first cascade.

Regulation of the dissolved oxygen in the effluent containing activated sludge in a particular cascade can only be obtained either by increasing or reducing the quantity of oxygen-containing gas recirculated in the particular cascade. In the known process, the input of oxygen is regulated by means of a hand valve in dependence upon the concentration of oxygen at the output end of the last cascade.

In this method of regulating the input of oxygen, the effect upon the concentration of the oxygen dissolved in the activated sludge suspension is very sluggish. Since the oxygen introduced into the gaseous zone of the first cascade is diluted by the gaseous mixture present therein, consisting of oxygen and carbon dioxide, it is not possible in view of fluctuations in load in the effluent to work with optimum values of dissolved oxygen in the activated-sludge-containing effluent.

In this known process, it is only possible with difficulty, if at all, to adjust certain optimum constant oxygen concentrations both in the gaseous phase and in the activated sludge suspension in the first cascades.

The object of the present invention is to improve the utilization of oxygen compared to the conventional process. The operating costs of installations operated with commercially pure oxygen are critically determined by the oxygen utilization factor. In addition, the optimum concentration of oxygen in the activated sludge suspension required for the biological degradation of the effluent ingredients must be kept substantially constant.

This presupposes inter alia the substantially inertialess adjustment of the oxygen concentration both in the gaseous phase of the first cascade and in the liquid phase of the individual cascades.

Accordingly, the present invention provides a process for regulating the input of oxygen in the treatment of effluent containing biochemically oxidisable constituents, optionally in several cascades, in the presence of activated sludge, a gas containing at least 20 to 45% by volume of $O_2$ being introduced in fine dispersion with intensive mixing into the effluent containing activated sludge in at least one gassing zone, characterised by the fact that a. commercially pure oxygen is introduced into the gaseous phase above the effluent containing activated sludge in such quantities that the oxygen content of the gaseous phase deviates by at most $\pm$ 10% from a given nominal value;

b. a component volume of the gaseous phase adjusted in accordance with a) is delivered to ejectors or other suitable gassing aggregates which introduce it in fine dispersion into an effluent containing activated sludge;

c. oxygen contents deviating by at most about $\pm$ 60% from a given nominal value being adjusted in the effluent containing activated sludge by directly introducing commercially pure oxygen into the component volume delivered to the ejectors.

The process according to the invention establishes optimum conditions for the consumption of oxygen in the individual cascades. The activated sludge flakes are preferably dispersed by the action of shear forces, dispersion being continued to the individual bacteria stage in the extreme case. In this dispersion process, the activated sludge flake is preferably dispersed to between about one third and one twentieth of its normal size (about 20 to 120 $\mu$m in diameter) and, with particular preference, to between one about fifth and one tenth of its normal size. The commercially pure oxygen introduced into the gaseous zone of the first cascade is immediately mixed in the gaseous zone with the recirculation gas, which contains carbon dioxide as the metabolic product of the microorganisms, and hence is fed back to the microorganisms as dilute, oxygen-containing gas. The oxygen-containing gas is introduced into the finely divided activated sludge suspension in the form of very small gas bubbles with a diameter of preferably less than about 4 mm and, with particular preference, less than about 1 mm. In the context of the invention, $O_2$-containing gs in an $O_2$-enriched gas containing at least about 25% by volume of $O_2$ and preferably about 30 to 70% by volume of $O_2$. This oxygen-containing gas is a recirculated gas mixture from which the carbon dioxide formed during degradation may also be partially removed in order thus to obtain an increase in the concentration of oxygen in the recirculated gas mixture and, hence, a greater oxygen input capacity.

Figure 2:
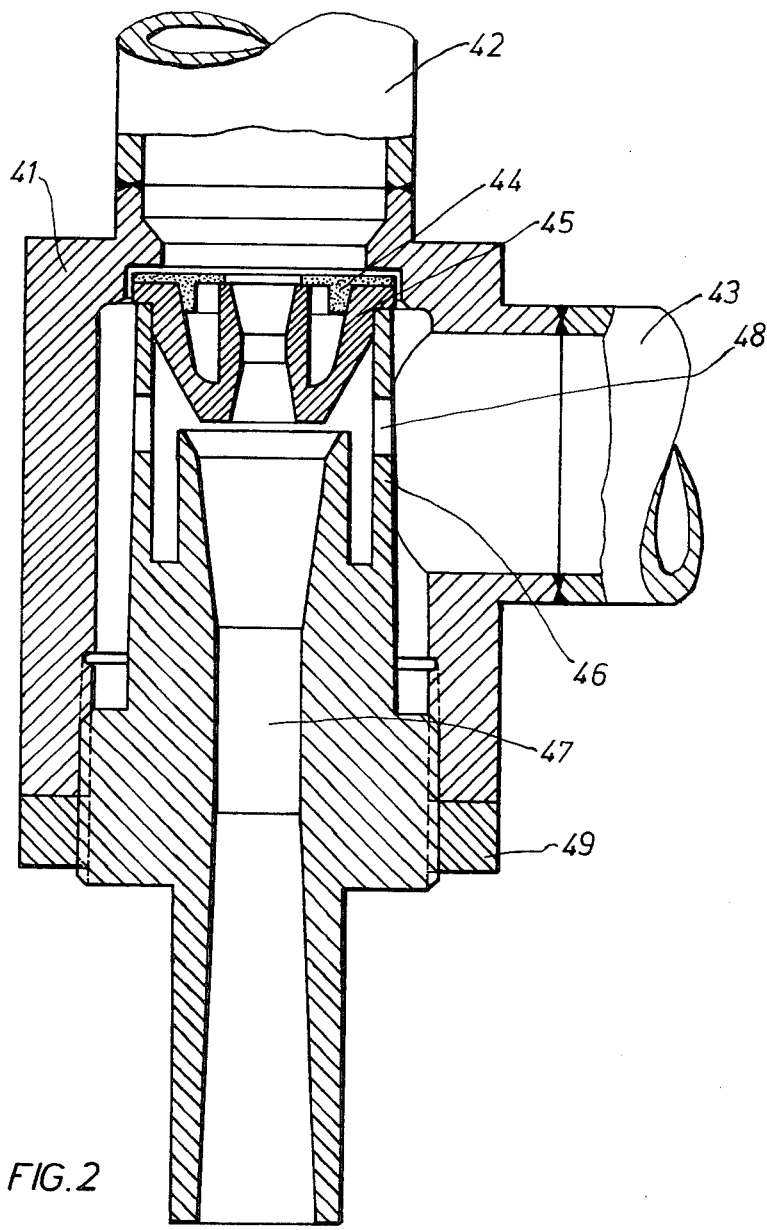

The invention will be further described with reference to the accompanying drawings wherein:

FIG. 1 shows a two-cascade effluent treatment process and apparatus in accordance with the present invention, and FIG. 2 shows an ejector nozzle suited for use in the process and apparatus of FIG. 1.

Referring now more particularly to FIG. 1, the reference numerals have the following meaning:

cascades: 1,2
liquid pipes: 3,5,6,19,22,24,34,36,37,39
liquid pumps: 4,10,23
ejectors: 7,25
gas compressors: 8,26
settling tanks: 9
gas pipes: 11,15,17,27,29,41
regulating valves: 12,18,30,32
gas zones in the activated sludge basin: 13,31
activated sludge basin: 14
sensors for measuring the oxygen del.: 16,28
throughflow opening: 20
partition in activated sludge basin: 21
measurement of oxygen concentration in the gas phase: 33
coagulator: 35
overflow: 38
gas opening: 40

Specifically, the process is carried out by bringing effluent, which contains biodegradable material, into intensive contact with oxygen by means of activated sludge and oxygen-containing gas. To this end, the effluent is delivered through the pipe 3 to the suction side of the recirculating pump 4 which circulates partially treated effluent containing activated sludge from the cascade 1 by way of the pipe 5. The mixture is delivered by the pump 4 through the pipe 6 to the ejectors 7 which are connected to the gas circulation compressor 8. The activated sludge in flake form which is returned from the settline basin 9 by means of the pump 10 is converted into a finely divided suspension under the flow conditions prevailing in the ejectors. According to the invention, commercially pure oxygen is delivered through the pipe 10 and the regulating valve 12 into the gaseous zone 13 of the first cascade 1 of the activated sludge basin 14 in such a quantity that the oxygen content of the gaseous phase 13 of the first cascade deviates by at most 10% from a predetermined nominal value. This nominal value is governed on the one hand by the content of biodegradable material in the effluent and on the other hand by the particular cascade of a cascade arrangement which is in question.

In order, in accordance with the invention, to keep the concentration of oxygen in the activated-sludge-containing effluent of the first cascade 1 constant at values in the range of about 1 mg/l to 4 mg/l (the nominal value in the present case being approximately 2.5 mg/l), irrespective of fluctuations in load in the effluent, commercially pure oxygen is directly introduced through the pipe 17 and regulating valve 18 into the recirculation gas in the pipe 15 in dependence upon the concentration of oxygen in the effluent containing activated sludge of the first cascade 1, as measured through the sensor 16, so that the constant concentrations of oxygen required are obtained in the activated-sludge-containing effluent of the first cascade 1. Sensors suitable for this purpose are described for example in GIT, Fachzeitschrift Fur das Laboratorium, No. 6, 715–720, 1972, and Die Wasserwirtschaft 9 )1969), 260–267. Corresponding to the quantity of effluent introduced through the pipe 3 and the quantity of activated sludge returned from the settling basin 9 by way of the pipe 19, a mixture of activated sludge and partially treated effluent flows into the second cascade 2 through the opening 20 in the partition 21 arranged between the cascades 1 and 2. Part of the mixture of partially treated effluent and activated sludge in the second cascade 2 is delivered through the pipe 22, the pump 23 and the pipe 24 to the ejectors 25 which are connected to the gas circulation compressor 26.

In order in accordance with the invention to maintain the concentration of oxygen in the activated-sludge-containing effluent in the second cascade 2 constant at values of about 4 to 8 mg/l (a nominal value of about 6 mg/l being prescribed in the present case), commercially pure oxygen is directly introduced through the pipe 29 and regulating valve 30 into the recirculation gas in the pipe 27 in dependence upon the concentration of oxygen in the activated sludge containing effluent of the second cascade 2, as measured by the sensor 28, so that the constant concentration of oxygen required is also obtained in the activated sludge containing effluent of the second cascade 2.

An excess pressure of about 20 to 100 mm water column prevails in the gaseous zones 13 and 31. The excess pressure may be adjusted to any required nominal value within this range and is kept constant by means of the regulating valves 12 and 32. The gaseous mixture in the gaseous zone 13 of the first cascade 1 consists essentially of about 40 to 80% by volume of oxygen and 20 to 60% by volume of carbon dioxide, while the gaseous mixture in the gaseous zone 31 of the second cascade 2 consists essentially of about 30 to 60% by volume of oxygen and 40 to 70% by volume of carbon dioxide. The concentration of oxygen in the gaseous zone 31 is governed by the concentration of oxygen in the gaseous zone 13. The concentration of oxygen in the gaseous zone 13 as measured at the measuring point 33, may be adjusted to any required optimal value, according to the condition of the effluent. Measurement of the oxygen concentration at the measuring point 33 may be carried out for example by the method described in "Messen und Regeln in der chemischen Technik", Springer-Verlag 1957, Hengstenberg, Sturm, Winkler "Gasanalyse auf Grund des Paramagnetismus", pages 463-482. Once adjusted, this optimum value is kept constant by the regulating valve 32 being kept open, in dependence upon the oxygen content measured at the measuring point 33, until the optimum value has been readjusted in the gas zone 13. When the regulating valve 32 is opened, a pressure difference relative to the nominal pressure value adjusted is created, being corrected by the introduction of commercially pure oxygen through the pipe 11 and regulating valve 12. During the introduction of commercially pure oxygen through the pipe 11 into the gaseous zone 13, the gaseous mixture flows from the gaseous zone 13 through the opening 40 into the gaseous zone 31 and from there is expelled through the pipe 41 and the regulating valve 32 into the open air.

Corresponding to the quantity of effluent introduced through the pipe 3 and to the quantity of activated sludge introduced by way of the pipe 19 from the settling tank 9 a mixture of activated sludge and treated effluent flows from the second cascade 2 through the pipe 34 to a coagulator 35 and flows in coagulated form through the pipes 36 and 37 into the settling basin 9 in which the treated effluent is separated from the activated sludge.

The coagulator 35 consists essentially of a cylindrical reactor into which the finely divided suspension runoff from the activated sludge basin 14 is introduced through a tangential inlet at linear rates of about 0.5 to 3 m/second and is put into a rotational movement to initiate a potential flow. Accordingly, the individual layers of liquid in this coagulator move at a faster rate, the closer they are to the axis of the cylinder. The residence times of a liquid or solids particle amount on average to between about 30 and 150 seconds and preferably to between about 40 to 100 seconds. A so-called vortex core is formed in the vicinity of the axis. It has been found that the relative movement between the individual flow layers which is present in the potential flow is particularly suitable for promoting cohesion of the finely divided activated sludge flakes. It is possible in this way to re-form settlable flakes which may then be separated from the treated effluent in the following settling basin 9. A potential flow is a flow about an axis of rotation which complies with the law $r \times c =$ constant ($r =$ distance of a liquid or solids particle from the axis of rotation, $c =$ velocity of the particle) [Donaueck, Technische Stromungslehre, 6th Edition, 1961, page 43].

The clear water flows out of the settling basin 9 through the overflow barrier 38 and, according to its purity, may either be further treated or run off. The activated sludge separated off is pumped back into the first cascade 1 by means of the pump 10, some of it being run off as excess sludge through the pipe 39.

The process according to the invention for regulating the supply of oxygen is by no means confined to the treatment of effluent in two cascades, and may also be carried out correspondingly in one cascade or in more than two cascades. The cascade process may be worked both in separate basins and also, by correspondingly arranging the ejectors, in a single basin without any partitions. Since, by virtue of their air lift pump effect, the gas bubbles leaving the ejectors mix the liquid in substantially the vertical direction only and since there is very little axial back-mixing of the liquid throughput, a "cascade arrangement" for the liquid throughput is actually obtained without any partitions in the liquid. Using the ejectors, the oxygen can readily be introduced at the bottom of the activated sludge basin, even at a depth of about 5 to 20 meters, which is particularly important so far as economic working is concerned. In those cases where the activated sludge basin has a depth of 10 meters or more, the ejectors can also be arranged at certain intervals one above the other (tier arrangement). In this way the effluent can be better distributed and mixed with the contents of the activated sludge basin.

Ejectors suitable for the purposes of the invention are described, for example, in A.G. Kasatkin, Chemische Verfahrenstechnik, Vol 1, VEB, Deutscher Verlag fur Grundstoffindustrie, Leipzig 1962, pages 138, 177, 180. An ejector nozzle which is the subject of a hitherto unpublished proposal is particularly suitable for the purposes of the invention. One such ejector nozzle is shown in FIG. 2 and is characterized by the fact that a housing 41 is fixedly connected to a feed pipe 42 for liquid and a feed pipe 43 for gases, a seal 44 being inserted into the housing 41 at the opening of the feed pipe 42 for liquids; an insertable propelling nozzle 45 being guided against the seal 44; a jacket pipe 46, which is fixedly connected to a mixing nozzle 47 formed with bores 48 and designed to be screwed into the housing, being arranged on the rim of the propelling nozzle 45; and a locknut 49 being arranged at the end of the housing 41. The ejector nozzle is preferably made of a plastic material, for example, rigid polyethylene and/or polypropylene.

In the process according to the invention, the effluent together with activated sludge is propelled through the feed pipe 42 at a rate of about 5 to 24 m/second and preferably at a rate of about 12 to 18 m/second. In the mixing nozzle 47, the flow energy of the propelling water is converted into pressure. The oxygen-containing gas entering through the opening 43 is broken up into small gas bubbles while the activated sludge flakes introduced are divided up into very small flakes. The mixture issues from the ejector nozzle in the form of a finely divided suspension. As they ascend through the activated sludge basin, the small gas bubbles can evolve more oxygen to the effluent. Ejector nozzles of the type in question are advantageously arranged at the bottom of the activated sludge basin or in tiers in the case of very deep basins. Large flakes of activated sludge are added to the effluent before it enters the ejector nozzle in quantities of about 20 to 60% by volume, based on effluent. In one advantageous embodiment, partially treated effluent, which already contains finely divided activated sludge or "finely divided suspension", is returned from the activated sludge basin in quantities of about 10 to 300% by volume, based on effluent, and passed through the ejector nozzle together with the effluent containing large flakes of activated sludge.

The process according to the invention for regulating the supply of oxygen has the following significant advantages over conventional processes:

The recirculation gas introduced into the ejectors 7 and 25 through the pipes 15 and 27 (FIG. 1) is extremely finely divided in the liquid, so that the phase interface thus created and the considerable difference in concentration between the concentration of oxygen in the recirculation gas and the concentration of the dissolved oxygen in the activated sludge/effluent mixture guarantee a rapid transfer on the one hand of gaseous oxygen into the liquid and on the other hand of oxygen dissolved in the liquid into the activated sludge present in the form of finely divided suspension. The difference in concentration may be further increased by adding effluent substantially free from oxygen and low-oxygen activated sludge to the recirculated suspension consisting of partially treated effluent and finely divided activated sludge.

Once it has been adjusted to an optimum value (approximtely 3 mg/l) the concentration of the oxygen dissolved in the activated sludge suspension can be kept substantially constant despite fluctuations in load of the effluent. The concentration of the oxygen dissolved in the activated suspension may be immediately increased as and when desired by the direct introduction of oxygen through the pipes 17 and 29 into the recirculation gas delivered to the ejectors 7 and 25 through the pipes 15 and 27. Since the input of oxygen is directly proportional to the difference between the saturation concentration and the actual concentration of the oxygen dissolved in the activated sludge suspension, optimum energy conditions are established through the adjustment of low concentrations of the oxygen dissolved in the activated sludge suspension. Over dosages of oxygen are avoided, which in particular guarantees better utilization of the oxygen than before.

The invention will be further described in the following illustrative example employing the apparatus of FIGS. 1 and 2. As to the percentages, when gases are involved they are by volume and when liquids are involved they are by weight, unless otherwise expressed or obvious from the text.

EXAMPLE

In one installation according to the invention it was possible to obtain the following results:

quantity of effluent; 4 m$^3$/h
effluent temperature; 20° C
effluent load; 1300 mg/l BOD$_5$, 2800 mg/l COD
depth of basin; 6.2 m
penetration depth of ejectors; 5.7 ,
number of ejectors; 1 ejector per 0.8 m$^2$
dissolved oxygen in cascade 1; 3 mg/l
dissolved oxygen in cascade 2; 4 mg/l
oxygen input; 175 kg O$_2$/day
oxygen concentration gas phase cascade 1; 72%
recycled sludge quantity cascade 1; 1.5 m$^3$/h and ejector
recycled sludge quantity cascade 2; 1.7 m$^3$/h and ejector
recirculation gas cascade 1; 3.6 m$^3$/h and ejector
recirculation gas cascade 2; 4.2 m$^3$/h and ejector According to the present process 60% of the recirculation gas is substituted by technical pure oxygen and supplied to the ejectors directly. Oxygen consumption amounts to 94% and is not negatively influenced by fluctuations in load in the effluent.

It will be appreciated that the instant specification and examples are set forth by way of illustration and not limitation, and that various modifications and changes may be made without departing from the spirit and scope of the present invention.

What is claimed is:

1. In the introduction of a finely dispersed gas containing at least about 20% of oxygen by volume with intensive mixing into a vessel having a gas space and effluent containing biochemically oxidizable constituents, in the presence of activated sludge particles, the improvement which comprises a. introducing oxygen into the gas space of said vessel in such amount that the oxygen content is from about 40 to 80% by volume,
   b. a component volume of the gases in the gas space being ejected as a fine dispersion into the effluent,
   c. directly introducing oxygen into the effluent in such amount that the oxygen content in the effluent is from about 1 to 4 mg/l,
   d. forwarding effluent from said vessel to a second vessel having a gas space and establishing an oxygen content of about 30 to 60% by volume in said second vessel gas space,
   e. ejecting a component volume of the gases in the second vessel gas space as a fine dispersion into the effluent in said second vessel,
   f. directly introducing oxygen into the effluent of said second vessel in such amount that the oxygen content in the effluent therein is from about 4 to 8 mg/l, and
   g. recycling partially treated effluent in an amount ranging from about 10 to 300% by volume of fresh effluent and ejecting them together,
   h. the conditions of ejection in (b) and (e) being such that the activated sludge particles are sub-divided to from about ⅓ to 1/20 their normal size due to the action of shear forces, whereby there is obtained an improved utilization of oxygen even in the event of fluctuations in load of the effluent.

* * * * *